United States Patent
Jung

(10) Patent No.: US 10,884,961 B2
(45) Date of Patent: Jan. 5, 2021

(54) DYNAMIC TERMINATION CIRCUIT, SEMICONDUCTOR APPARATUS AND SYSTEM INCLUDING THE SAME

(71) Applicant: SK hynix Inc., Icheon-si (KR)

(72) Inventor: Hae Kang Jung, Gwangmyeong-si (KR)

(73) Assignee: SK hynix Inc., Gyeonggi-do (KR)

( * ) Notice: Subject to any disclaimer, the term of this patent is extended or adjusted under 35 U.S.C. 154(b) by 13 days.

(21) Appl. No.: 15/642,639

(22) Filed: Jul. 6, 2017

(65) Prior Publication Data

US 2018/0181511 A1   Jun. 28, 2018

(30) Foreign Application Priority Data

Dec. 26, 2016   (KR) .......................... 10-2016-0179012

(51) Int. Cl.
*G06F 13/36* (2006.01)
*G06F 13/40* (2006.01)

(52) U.S. Cl.
CPC .......... *G06F 13/36* (2013.01); *G06F 13/4022* (2013.01); *G06F 13/4068* (2013.01); *Y02D 10/00* (2018.01)

(58) Field of Classification Search
CPC .................................. G11C 8/00; G11C 8/18
USPC ...................................... 710/117; 365/189.07
See application file for complete search history.

(56) References Cited

U.S. PATENT DOCUMENTS

| | | | | |
|---|---|---|---|---|
| 4,370,736 A * | 1/1983 | Takahashi | .............. | G11C 5/063 365/155 |
| 5,459,440 A * | 10/1995 | Claridge | ................ | H03H 11/30 333/17.3 |
| 6,586,964 B1 * | 7/2003 | Kent | .................... | H04L 25/0298 326/30 |
| 6,812,732 B1 * | 11/2004 | Bui | ..................... | H04L 25/0278 326/27 |
| 6,836,144 B1 * | 12/2004 | Bui | ..................... | H04L 25/0278 326/26 |
| 7,135,884 B1 * | 11/2006 | Talbot | .................. | H03K 17/164 326/30 |
| 7,800,399 B1 | 9/2010 | Schumann | | |
| 8,638,622 B2 | 1/2014 | Wang et al. | | |
| 9,143,171 B1 | 9/2015 | Chang et al. | | |
| 2002/0118037 A1 * | 8/2002 | Kim | .................... | H04L 25/0298 326/30 |
| 2003/0076712 A1 * | 4/2003 | Jang | ..................... | G11C 7/1078 365/194 |
| 2003/0221863 A1 * | 12/2003 | Marshall | .............. | H05K 1/0246 174/250 |

(Continued)

FOREIGN PATENT DOCUMENTS

CN    102282618 A    12/2011
CN    105930290 A    9/2016

*Primary Examiner* — Titus Wong
(74) *Attorney, Agent, or Firm* — William Park & Associates Ltd.

(57) ABSTRACT

A semiconductor apparatus may include a receiver circuit and a termination circuit. The receiver circuit may be coupled to a receiving node, and configured to receive a signal transmitted through a signal transmission line. The termination circuit may be configured to be turned on to set a resistance value of the receiving node in a transition period of the signal, and turned off in a stabilization period of the signal.

17 Claims, 8 Drawing Sheets

(56) References Cited

U.S. PATENT DOCUMENTS

| | | | |
|---|---|---|---|
| 2004/0196725 A1* | 10/2004 | Kang | G11C 7/1066 365/230.08 |
| 2004/0251983 A1* | 12/2004 | Hsu | H03H 7/38 333/32 |
| 2005/0001650 A1* | 1/2005 | Schafer | H03K 5/007 326/30 |
| 2005/0094468 A1* | 5/2005 | Martin | G11C 7/1051 365/222 |
| 2005/0122131 A1* | 6/2005 | McCollum | H04L 25/0298 326/30 |
| 2005/0286319 A1* | 12/2005 | Janzen | G06F 13/4086 365/189.011 |
| 2008/0112233 A1* | 5/2008 | Woo | G11C 7/1045 365/189.05 |
| 2008/0239844 A1* | 10/2008 | Carnevale | G11C 29/023 365/193 |
| 2010/0007375 A1* | 1/2010 | Lee | H03K 19/01858 326/30 |
| 2010/0327902 A1* | 12/2010 | Shau | G11C 7/1066 326/30 |
| 2012/0013361 A1 | 1/2012 | Ware | |
| 2013/0010546 A1* | 1/2013 | Wang | G11C 7/02 365/189.07 |
| 2013/0335115 A1 | 12/2013 | Song | |
| 2014/0140146 A1* | 5/2014 | Mozak | G05F 1/10 365/189.07 |
| 2014/0355359 A1* | 12/2014 | Linam | H04L 7/0041 365/189.02 |
| 2016/0254931 A1* | 9/2016 | Jung | H04L 25/0278 375/257 |
| 2017/0110175 A1* | 4/2017 | Kim | G11C 11/4096 |

\* cited by examiner

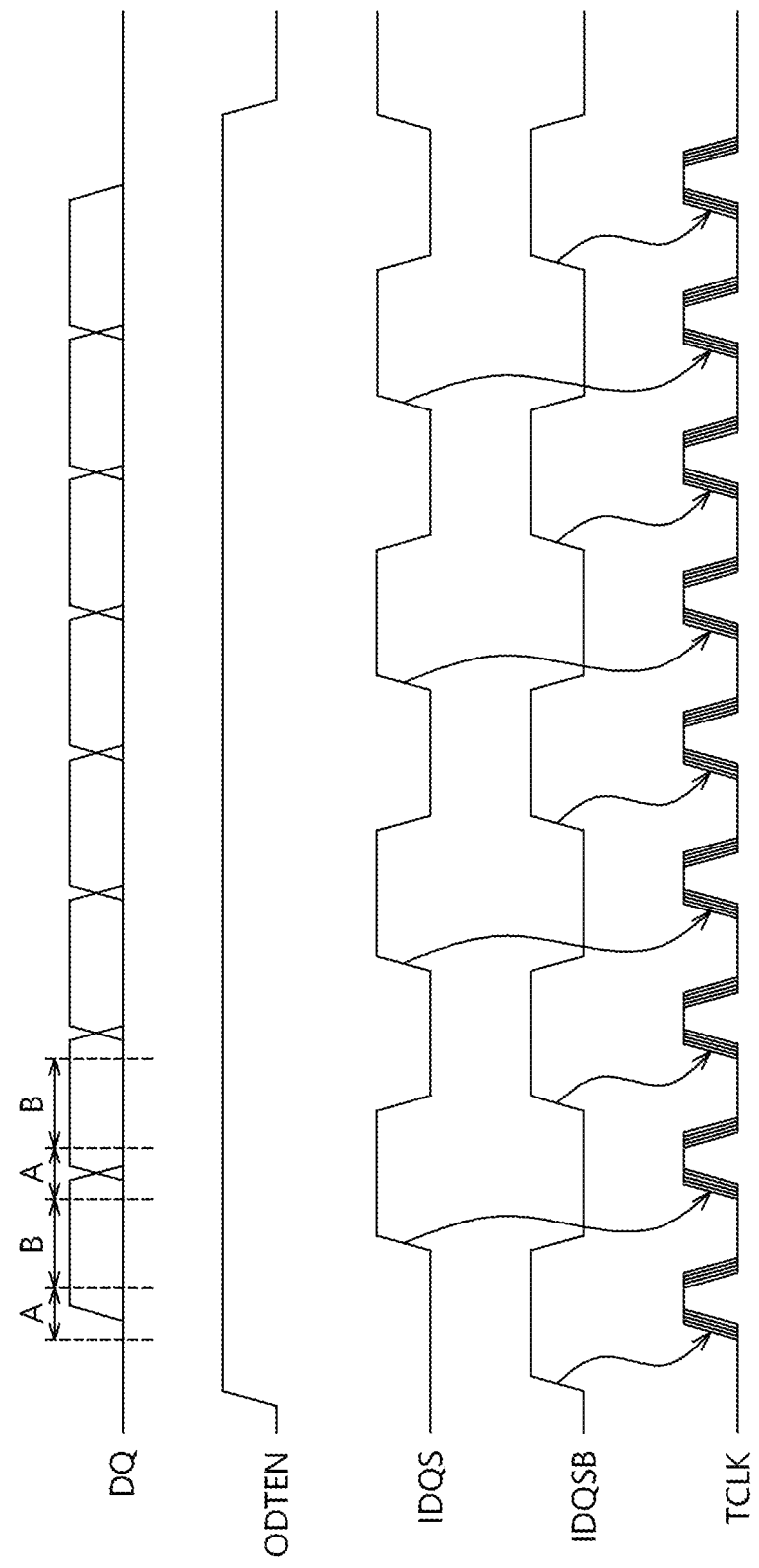

DYNAMIC TERMINATION CIRCUIT, SEMICONDUCTOR APPARATUS AND SYSTEM INCLUDING THE SAME

CROSS-REFERENCES TO RELATED APPLICATION

The present application claims priority under 35 U.S.C. § 119(a) to Korean application number 10-2016-0179012, filed on Dec. 26, 2016, in the Korean Intellectual Property Office, which is incorporated herein by reference in its entirety as though fully set forth herein.

BACKGROUND

The present invention relates generally to semiconductor technology, and more particularly, to a termination circuit and a semiconductor apparatus and system including the same.

An electronic device may include a large number of electronic components, and a large part of the electronic components may be implemented with a computer system semiconductor. Semiconductor apparatuses constituting a computer system may transmit a signal in synchronization with a clock, and perform serial communication. While the operating speed of the semiconductor apparatuses is improved and the power consumption of the semiconductor apparatuses is reduced, a transmitted signal may be distorted due to the influence of external noise and impedance mismatching between the semiconductor apparatuses. Therefore, the semiconductor apparatuses include an on-die termination circuit for performing impedance matching in order to accurately transmit a signal.

SUMMARY

In an embodiment in accordance with the present invention, a semiconductor apparatus may include: a receiver circuit coupled to a receiving node, and configured to receive a signal transmitted through a signal transmission line; and a termination circuit that provides a selectable resistance value of the receiving node.

In an embodiment in accordance with the present invention, a semiconductor apparatus may include: a receiver circuit coupled to a receiving node, and configured to receive a signal transmitted through a signal transmission line; and a termination circuit configured to be turned on to set a resistance value of the receiving node in a transition period of the signal, and turned off in a stabilization period of the signal.

In an embodiment, a semiconductor apparatus may include: a receiver circuit coupled to a receiving node, and configured to receive a signal transmitted through a signal transmission line; a termination clock generator configured to generate a plurality of termination clock signals which are sequentially enabled, based on a clock signal; and a termination circuit configured to set a resistance value of the receiving node based on an enable signal and the plurality of termination clock signals.

In another embodiment in accordance with the present invention, a semiconductor apparatus may include: a data receiver circuit coupled to a data bus to receive data, and configured to receive the data in synchronization with a data strobe signal; a strobe receiver circuit coupled to a strobe bus to receive the data strobe signal; a termination clock signal generator configured to generate a termination clock signal based on the data strobe signal; and a termination circuit configured to set a resistance value of the receiving node based on an enable signal and the termination clock signal,

BRIEF DESCRIPTION OF THE DRAWINGS

FIG. 9 is a timing diagram associated with operation of the semiconductor system according to an embodiment.

DETAILED DESCRIPTION

Hereinafter, embodiments in accordance with the present invention will be explained in more detail with reference to the accompanying drawings. Although the present invention is described with reference to a number of example embodiments thereof, it should be understood that numerous other modifications and variations may be devised by one skilled in the art that will fall within the spirit and scope of the invention.

Figure 1:
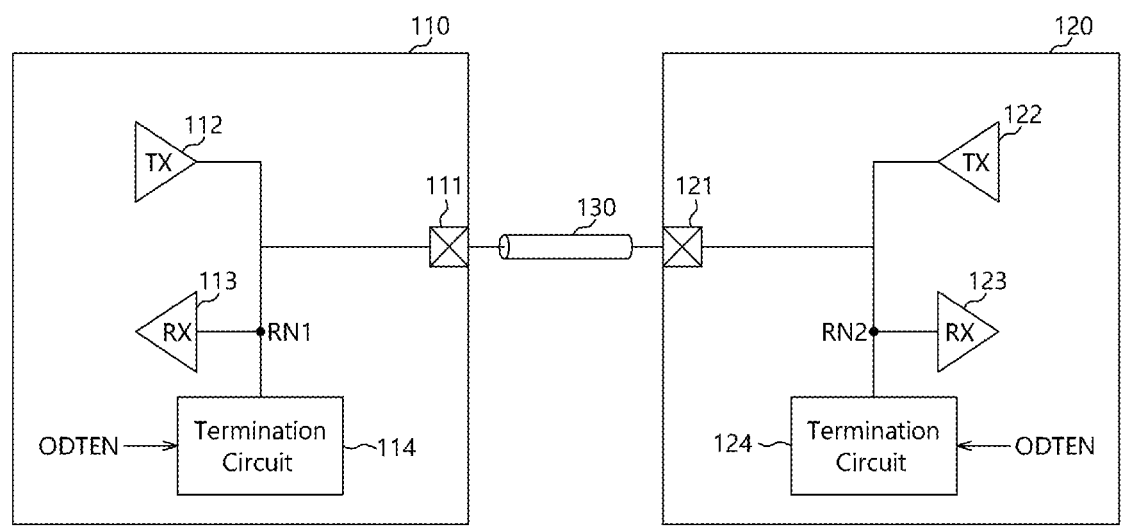
FIG. 1 is a diagram illustrating a configuration of a semiconductor system in an embodiment in accordance with the present invention.

FIG. 1 is a diagram illustrating a configuration of a semiconductor system 1 according to an embodiment. In FIG. 1, the semiconductor system 1 in accordance with the present invention may include first and second semiconductor apparatuses 110 and 120. The first and second semiconductor apparatuses 110 and 120 may serve as electronic components which communicate with each other. In an embodiment, the first semiconductor apparatus 110 may serve as a master device, and the second semiconductor apparatus 120 may serve as a slave device which is controlled and operated by the first semiconductor apparatus 110. For example, the first semiconductor apparatus 110 may serve as a host device such as a processor or controller, and the processor may include a CPU (Central Processing Unit), GPU (Graphic Processing Unit), MMP (Multi-Media Processor), digital signal processor and memory controller. Furthermore, processor chips such as an AP (Application Processor), which have various functions, may be combined and implemented in the form of SOC (System On Chip). The second semiconductor apparatus 120 may serve as a memory device, and the memory device may include a volatile memory and a nonvolatile memory. The volatile memory may include SRAM (Static RAM), DRAM (Dynamic RAM) and SDRAM (Synchronous DRAM), and the nonvolatile memory may include ROM (Read Only Memory), PROM (Programmable ROM), EEPROM (Electrically Erase and Programmable ROM), EPROM (Electrically Programmable ROM), flash memory, PRAM (Phase change RAM), MRAM (Magnetic RAM), RRAM (Resistive RAM), FRAM (Ferroelectric RAM) and the like.

The first and second semiconductor apparatuses 110 and 120 may be coupled through a signal transmission line 130. The first semiconductor apparatus 110 may include a pad 111, and the pad 111 may be coupled to the signal transmission line 130. The second semiconductor apparatus 120 may include a pad 121, and the pad 121 may be coupled to the signal transmission line 130. The signal transmission line 130 may include a channel, link or bus. The first semiconductor apparatus 110 may include a transmitter circuit (TX) 112 and a receiver circuit (RX) 113. The transmitter circuit 112 may transmit a signal to the second semiconductor apparatus 120 through the signal transmission line 130. The receiver circuit 113 may receive a signal from the second semiconductor apparatus 120 through the signal transmission line 130. Similarly, the second semiconductor apparatus 120 may include a transmitter circuit (TX) 122 and a receiver circuit (RX) 123. The transmitter circuit 122 may transmit a signal to the first semiconductor apparatus 110 through the signal transmission line 130. The receiver circuit 123 may receive a signal from the first semiconductor apparatus 110 through the signal transmission line 130.

The first and second semiconductor apparatuses 110 and 120 may further include termination circuits 114 and 124, respectively. The termination circuits 114 and 124 may set the resistance values of receiving nodes RN1 and RN2 coupled to the receiver circuits 113 and 123, respectively. The termination circuit 114 may set the resistance value of the receiving node RN1 in order to match the impedances of the transmitter circuit 122 and the receiver circuit 113, and drive the receiving node RN1 to a termination voltage. The termination circuit 124 may set the resistance value of the receiving node RN2 in order to match the impedances of the transmitter circuit 112 and the receiver circuit 123, and drive the receiving node RN2 to the level of the termination voltage. In the present embodiment, the termination circuits 114 and 124 may dynamically perform a termination operation. The termination circuits 114 and 124 may be turned on in a transition period of a signal transmitted through the signal transmission line 130, and coupled to the receiving nodes RN1 and RN2. Furthermore, the termination circuits 114 and 124 may be turned off in a stabilization period of the signal, and not coupled to the receiving nodes RN1 and RN2.

Figure 2:
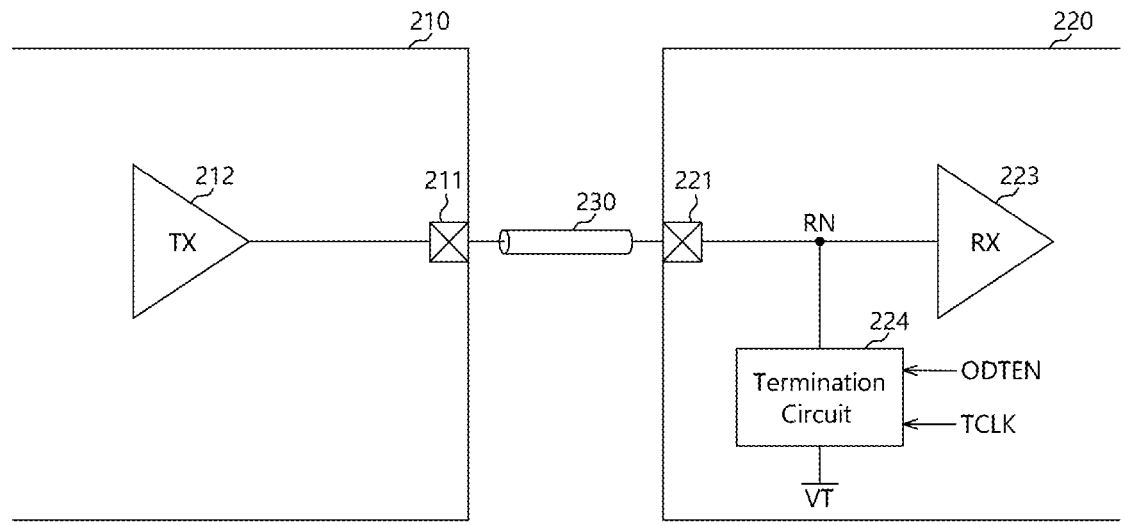
FIG. 2 is a diagram illustrating a configuration of a semiconductor system.

FIG. 2 is a diagram illustrating a configuration of a semiconductor system 2 according to an embodiment. In FIG. 2, the semiconductor system 2 may include first and second semiconductor apparatuses 210 and 220. The first semiconductor apparatus 210 may include a transmitter circuit 212, and be coupled to a signal transmission line 230 through a pad 211. The transmitter circuit 212 may transmit a signal to the second semiconductor apparatus 220 through the signal transmission line 230. The second semiconductor apparatus 220 may include a receiver circuit (RX) 223 and a termination circuit 224. The receiver circuit 223 may be coupled to the signal transmission line 230 through a pad 221, and receive a signal transmitted from the first semiconductor apparatus 210.

The termination circuit 224 may be coupled to a receiving node RN. The receiving node RN may be coupled to the pad 221 and the receiver circuit 223. The termination circuit 224 may set a resistance value of the receiving node RN. The termination circuit 224 may be turned on in a transition period of a signal received through the signal transmission line 230 and the pad 221, and set the resistance value of the receiving node RN. The termination circuit 224 may be turned off in a stabilization period of the signal, and not coupled to the receiving node RN. The termination circuit 224 may receive an enable signal ODTEN and a termination clock TCLK. The resistance value of the termination circuit 224 may be set based on the enable signal ODTEN. The enable signal ODTEN may be enabled before the signal is transmitted from the first semiconductor apparatus 210, and disabled after the transmission of the signal is completed. The termination circuit 224 may be coupled to the receiving node RN based on the termination clock signal TCLK. The termination clock signal TCLK may be enabled at each period where the signal transitions. For example, when the signal transitions in synchronization with a specific clock signal, the termination clock signal TCLK may be generated based on the specific clock signal. The termination circuit 224 may be coupled to the receiving node RN in a high level period of the termination clock signal TCLK, and not coupled to the receiving node RN in a low level period of the termination clock signal TCLK. The termination circuit 224 may be coupled to a termination voltage VT, and turned on to drive the receiving node RN to the termination voltage VT. The termination voltage VT may have various levels depending on a termination method. For example, when the semiconductor system 2 uses a high termination method, the termination voltage VT may have a level corresponding to a supply voltage of the receiver circuit 223. When the semiconductor system 2 uses a low termination method, the termination voltage VT may have a level corresponding to a ground voltage.

Figure 3:
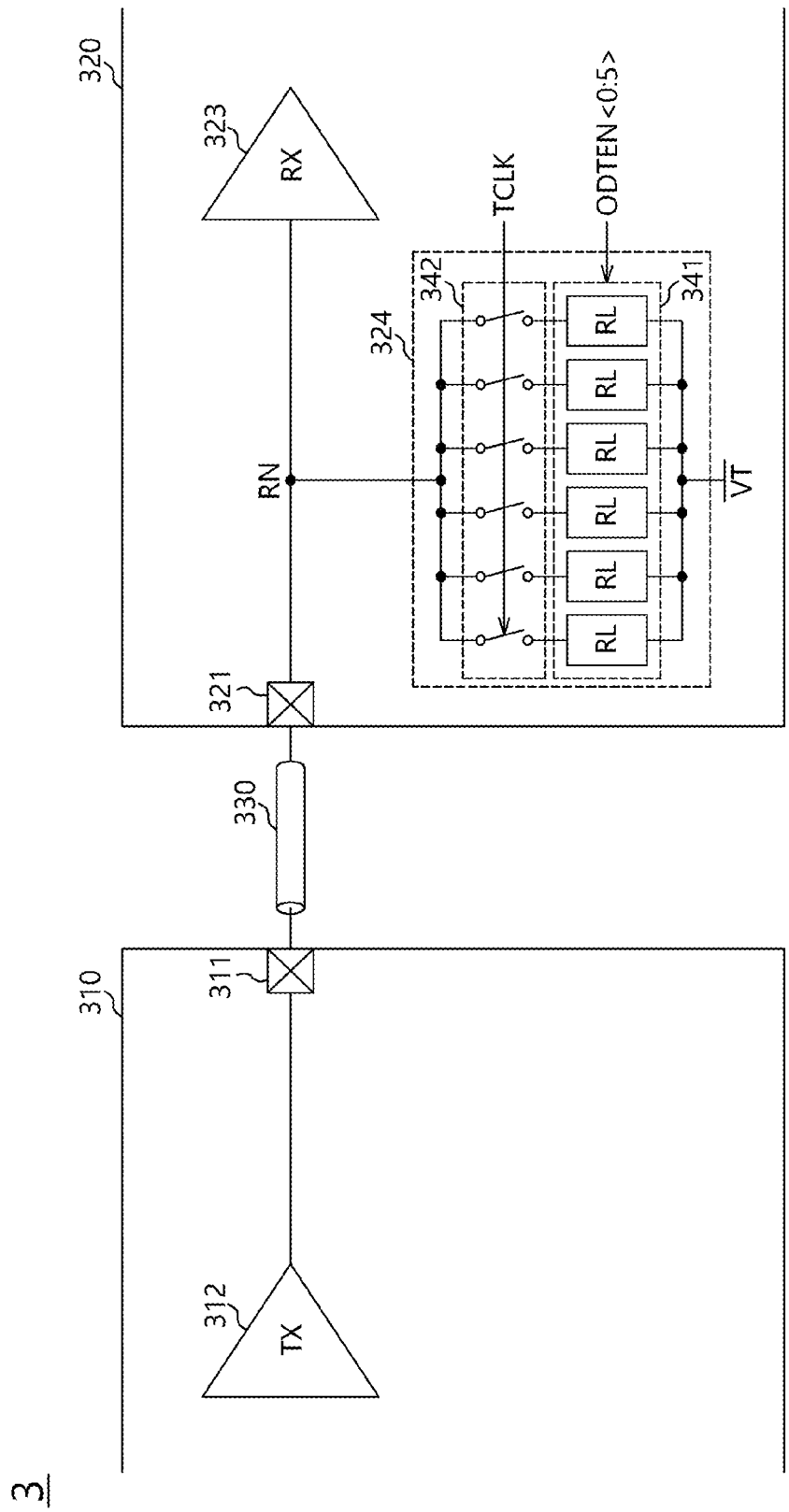
FIG. 3 is a diagram illustrating a configuration of a semiconductor system with a termination circuit.

FIG. 3 is a diagram illustrating a configuration of a semiconductor system 3 according to an embodiment. In FIG. 3, the semiconductor system 3 may include first and second semiconductor apparatuses 310 and 320. The first semiconductor apparatus 310 may be coupled to a signal transmission line 330 through a pad 311, and include a transmitter circuit 312 which transmits a signal through the pad 311 and the signal transmission line 330. The second semiconductor apparatus 320 may be coupled to the signal transmission line 330 through a pad 321, and include a receiver circuit 323 which receives a signal transmitted through the signal transmission line 330. The second semiconductor apparatus 320 may include a termination circuit 324. The termination circuit 324 may be coupled to a receiving node RN, and the receiving node RN may be coupled to the pad 321 and the receiver circuit 323. The second semiconductor apparatus 320 may be applied as the semiconductor apparatus 220 of FIG. 2.

The termination circuit 324 may set the resistance value of the receiving node RN based on an enable signal ODTEN<0:5> and a termination clock signal TCLK. The termination circuit 324 may include a termination resistor unit 341 and a switching unit 342. The termination resistor unit 341 may receive the enable signal ODTEN<0:5>, and the resistance value of the termination resistor unit 341 may be set based on the enable signal ODTEN<0:5>. The termination resistor unit 341 may include a plurality of resistor legs RL. The plurality of resistor legs RL may be coupled in parallel between the receiving node RN and a termination voltage terminal VT. The enable signal ODTEN<0:5> may include a code signal having a plurality of bits, for example. With a change in number of resistor legs RL which are turned on according to the enable signal ODTEN<0:5>, the resistance value of the termination resistor unit 341 may be changed. For example, each of the resistor legs RL may have a turn-on resistance value of 240Ω. Therefore, when 6 resistor legs RL are turned on according to the enable signal ODTEN<0:5>, the resistance value of the termination resistor unit 341 may be set to 40Ω, and when three resistor legs RL are turned on according to the enable signal ODTEN<0:3>, the resistance value of the termination resistor unit 341 may be set to 80Ω. FIG. 3 illustrates that the termination resistor unit 341 includes six resistor legs RL. However, the number of resistor legs RL is only an example, and may be changed to various values.

The switching unit 342 may couple the termination resistor unit 341 to the receiving node RN based on the termination clock signal TCLK. For example, the switching unit 342 may be turned on in a high level period of the termination clock signal TCLK, and couple the resistor legs RL of the termination resistor unit 341 to the receiving node RN. The switching unit 342 may be turned off in a low level period of the termination clock signal TCLK, and block the coupling between the termination resistor unit 341 and the receiving node RN. When the termination resistor unit 341 is coupled to the receiving node RN through the switching unit 342, the termination resistor unit 341 may drive the receiving node RN to the termination voltage VT, and set the resistance value of the receiving node RN to the resistance value of the termination resistor unit 341.

Figure 4:
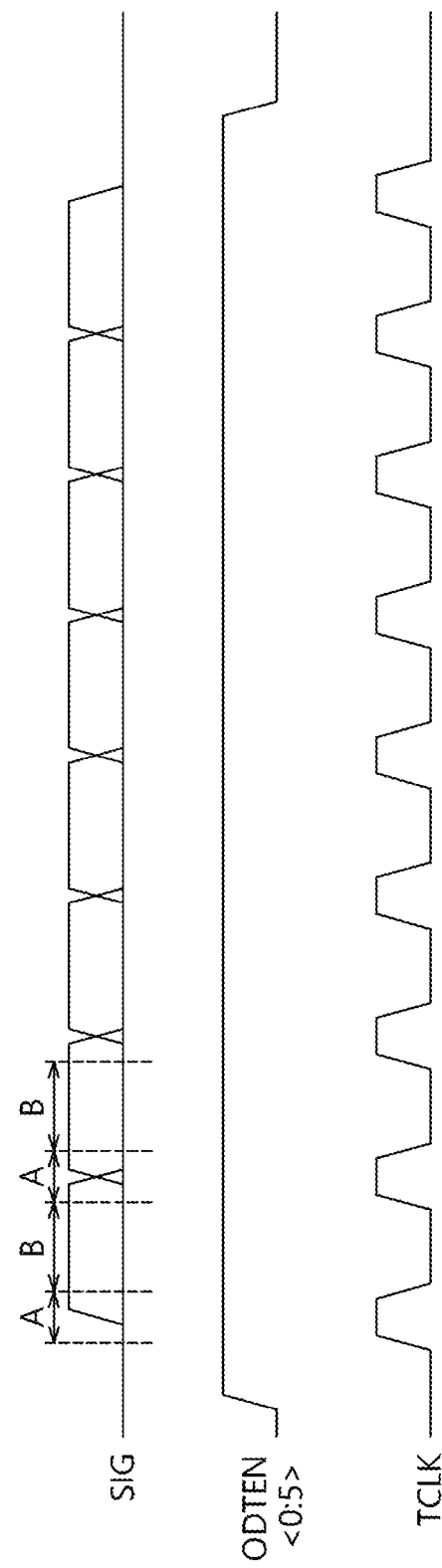
FIG. 4 is a timing diagram associated with operation of the semiconductor system in an embodiment in accordance with the present invention.

FIG. 4 is a diagram illustrating the operation of the semiconductor system according to the present embodiment. Referring to FIGS. 3 and 4, the operation of the semiconductor system 3 according to the present embodiment will be described as follows. The transmitter circuit 312 of the first semiconductor apparatus 310 may transmit a signal SIG through the signal transmission line 330. The signal SIG may include a data signal which transitions in synchronization with a clock signal. Before the signal SIG is transmitted, the enable signal ODTEN<0:5> may be enabled. According to the enable signal ODTEN<0:5>, the resistance value of the termination resistor unit 341 may be set. The termination clock signal TCLK may be generated based on a clock signal with which the signal SIG is synchronized, for example. Therefore, the termination clock signal TCLK may be enabled whenever the signal SIG transitions. As illustrated in FIG. 4, a period in which the level of the signal SIG is changed may be defined as a transition period A, and a period in which the level of the signal SIG is retained may be defined as a stabilization period B. The termination clock signal TCLK may have a high level in the transition period A of the signal SIG, and have a low level in the stabilization period B of the signal SIG. Based on the termination clock signal TCLK, the switching unit 342 may couple the termination resistor unit 341 to the receiving node RN in each transition period A of the signal SIG, and block the coupling between the termination resistor unit 341 and the receiving node RN in each stabilization period B of the signal SIG.

In the transition period A of the signal SIG, the receiver circuit 323 needs to accurately sense a level change of the signal SIG, in order to improve the operation reliability of the second semiconductor apparatus 320. For this operation, the termination circuit 324 needs to set the resistance value of the receiving node RN, and drive the receiving node RN to the termination voltage VT. In the stabilization period B of the signal SIG, the level of the signal SIG is not changed. Thus, when the receiving node RN is continuously driven to the termination voltage VT, an unnecessary current may be consumed. In the present embodiment, the termination circuit 324 can couple the termination resistor unit 341 to the receiving node RN only in the transition period A of the signal SIG based on the termination clock signal TCLK, thereby reducing unnecessary current consumption.

Figure 5:
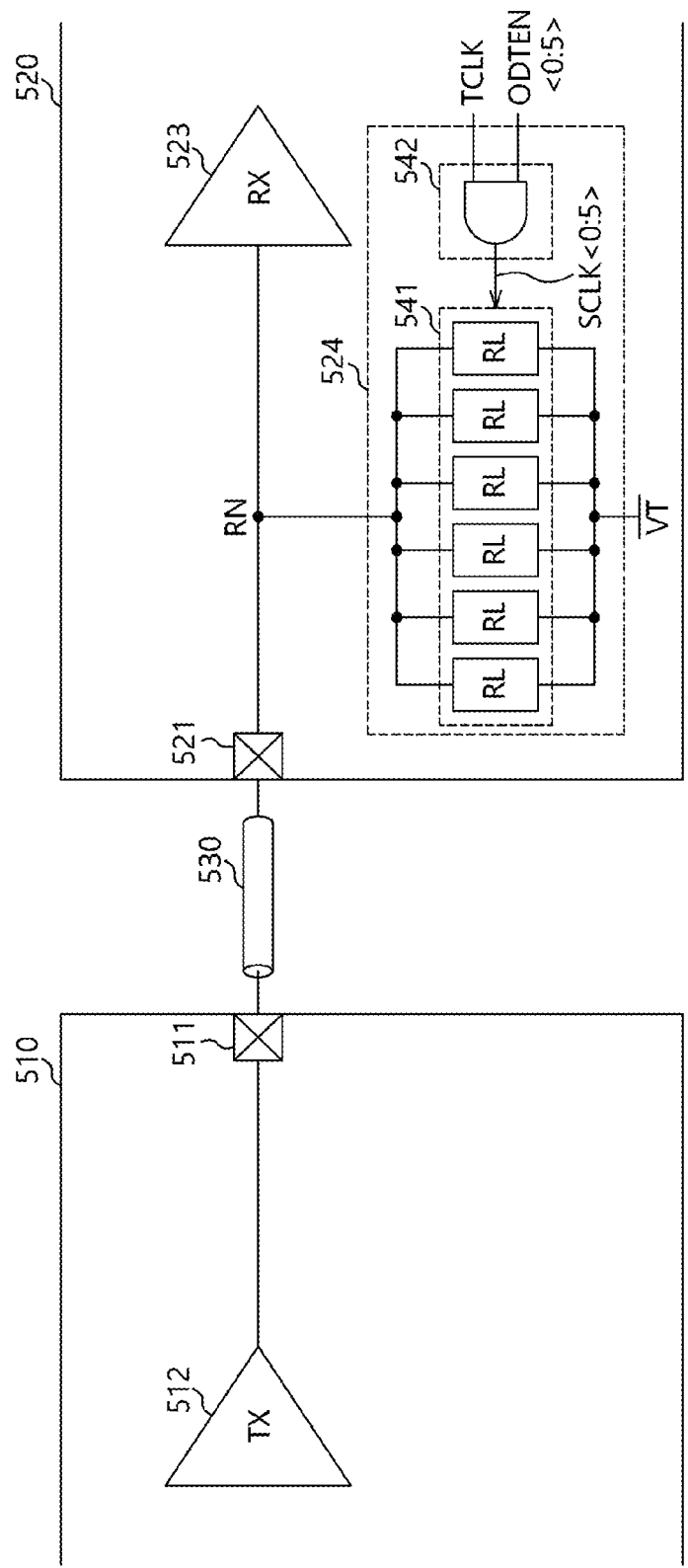
FIG. 5 is a diagram illustrating a configuration of a semiconductor system according to an embodiment with a termination circuit.

FIG. 5 is a diagram illustrating a configuration of a semiconductor system 5 according to an embodiment. In FIG. 5, the semiconductor system 5 may include first and second semiconductor apparatuses 510 and 520. The first semiconductor apparatus 510 may be coupled to a signal transmission line 530 through a pad 511, and include a transmitter circuit 512 which transmits a signal through the pad 511 and the signal transmission line 530. The second semiconductor apparatus 520 may be coupled to the signal transmission line 530 through a pad 521, and include a receiver circuit 523 which receives a signal transmitted through the signal transmission line 530. The second semiconductor apparatus 520 may include a termination circuit 524. The termination circuit 524 may be coupled to a receiving node RN, and the receiving node RN may be coupled to the pad 521 and the receiver circuit 523. The second semiconductor apparatus 520 may be applied as the semiconductor apparatus 220 of FIG. 2.

The termination circuit 524 may set the resistance value of the receiving node RN based on an enable signal ODTEN<0:5> and a termination clock signal TCLK, and drive the receiving node RN to the termination voltage VT. The termination circuit 524 may include a termination resistor unit 541 and a switching control unit 542. The termination resistor unit 541 may be coupled to the receiving node RN based on a switching control signal SCLK<0:5>, and the resistance value of the termination resistor unit 541 may be set based on the switching control signal SCLK<0:5>. The termination resistor unit 541 may include a plurality of resistor legs RL. The plurality of resistor legs RL may be coupled in parallel between the receiving node RN and the termination voltage terminal VT. The enable signal ODTEN<0:5> may include a code signal having a plurality of bits. With a change in number of resistor legs RL which are turned on according to the switching control signal SCLK<0:5>, the resistance value of the termination resistor unit 541 may be changed.

The switching control unit 542 may receive the enable signal ODTEN<0:5> and the termination clock signal TCLK. The switching control unit 542 may generate the switching control signal SCLK<0:5> by combining the enable signal ODTEN<0:5> and the termination clock signal TCLK. For example, the switching control unit 542 may provide the termination clock signal TCLK as the switching control signal SCLK<0:5> when the enable signal ODTEN<0:5> is enabled. The switching control unit 542 may include an AND gate. The AND gate may generate the switching control signal SCLK<0:5> by performing an AND operation on the enable signal ODTEN<0:5>0 and the termination clock signal TCLK.

Figure 6:
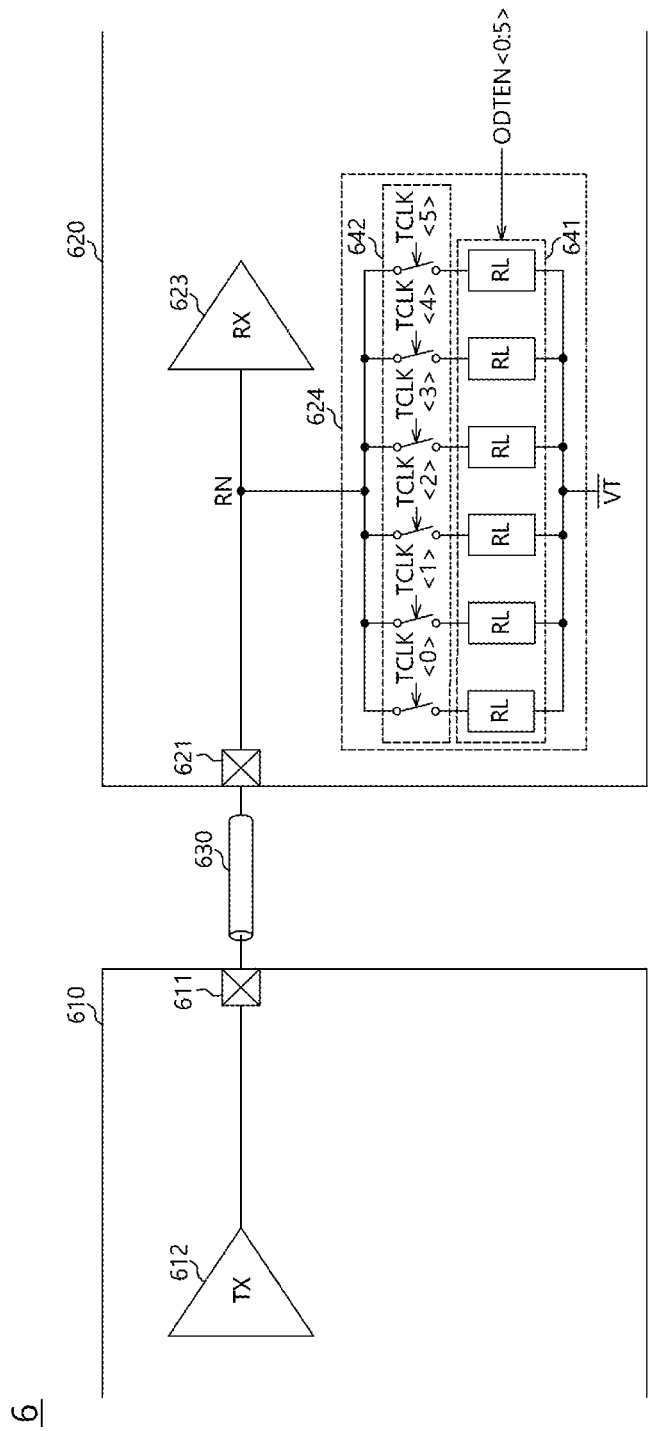
FIG. 6 is a diagram illustrating a configuration of a semiconductor system according to an embodiment with a termination circuit.

FIG. 6 is a diagram illustrating a configuration of a semiconductor system 6 according to an embodiment. In FIG. 6, the semiconductor system 6 may include first and second semiconductor apparatuses 610 and 620. The first semiconductor apparatus 610 may be coupled to a signal transmission line 630 through a pad 611, and include a transmitter circuit 612 which transmits a signal through the pad 611 and the signal transmission line 630. The second semiconductor apparatus 620 may be coupled to the signal transmission line 630 through a pad 621, and include a receiver circuit 623 which receives a signal transmitted through the signal transmission line 630. The second semiconductor apparatus 620 may include a termination circuit 624. The termination circuit 624 may be coupled to a receiving node RN, and the receiving node RN may be coupled to the pad 621 and the receiver circuit 623. The second semiconductor apparatus 620 may be applied as the semiconductor apparatus 220 of FIG. 2.

The termination circuit 624 may set the resistance value of the receiving node RN based on an enable signal ODTEN<0:5> and a plurality of termination clock signals TCLK<0:5>, and drive the receiving node RN to the termination voltage VT. In other words, the plurality of termination clock signals TCLK<0:5> may be applied, unlike the termination clock signal TCLK of FIGS. 3 and 5. The plurality of termination clock signals TCLK<0:5> may be enabled in a transition period of the signal. The plurality of termination clock signals TCLK<0:5> may be sequentially enabled, and sequentially disabled according to the order in which the plurality of termination clocks signals TCLK<0:5> are enabled. For example, in the transition period of the signal, the first termination clock signal TCLK<0> may be first enabled, and the second to sixth termination clock signals TCLK<1:5> may be sequentially enabled. Furthermore, the first termination clock signal TCLK<0> may be first disabled, and the second to sixth termination clock signals TCLK<1:5> may be sequentially disabled.

The termination circuit 624 may include a termination resistor unit 641 and a switching unit 642. The termination resistor unit 641 may include a plurality of resistor legs RL which are coupled in parallel between the receiving node RN and the termination voltage terminal VT. The number of resistor legs RL which are turned on according to the enable signal ODTEN<0:5> may be changed to set the resistance value of the termination resistor unit 641. The switching unit 642 may couple the termination resistor unit 641 to the receiving node RN based on the plurality of termination clock signals TCLK<0:5>. In the transition period of the signal, the switching unit 642 may sequentially couple the plurality of resistor legs RL to the receiving node RN based on the plurality of termination clock signals TCLK<0:5>, and sequentially block the couplings between the plurality of resistor legs RL and the receiving node RN.

Figure 7:
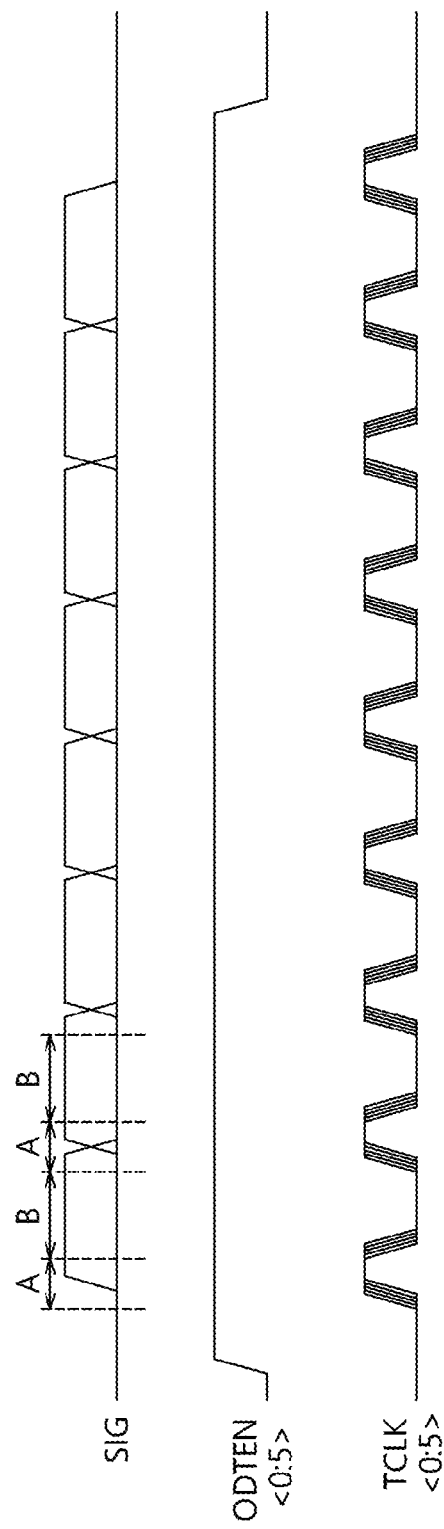
FIG. 7 is a timing diagram associated with operation of the semiconductor system in an embodiment in accordance with the present invention.

FIG. 7 is a diagram illustrating the operation of the semiconductor system according to the present embodiment. Referring to FIGS. 6 and 7, the operation of the semiconductor system 6 according to the present embodiment will be described as follows. Before the signal SIG is transmitted from the first semiconductor apparatus 610 through the signal transmission line 630, the enable signal ODTEN<0:5> may be enabled. The signal SIG may be transmitted in synchronization with the clock signal, for example, and the plurality of termination clock signals TCLK<0:5> may be generated based on the clock signal. In a transition period A of the signal SIG, the plurality of termination clock signals TCLK<0:5> may be sequentially enabled, and then sequentially disabled. Suppose that the plurality of resistor legs RL have a turn-on resistance value of 240Ω. When the first termination clock signal TCLK<0> is enabled, the resistance value of the termination resistor unit 641 may be set to 240Ω. Then, while the second to sixth termination clock signals TCLK<1:5> are sequentially enabled, the resistance value of the termination resistor unit 641 may be changed to 120, 80, 60 and 40Ω. Similarly, while the first to sixth termination clock signals TCLK<0:5> are sequentially disabled, the resistance value of the termination resistor unit 641 may be changed to 60, 80, 120 and 240Ω, and the coupling between the termination resistor unit 641 and the receiving node RN may be blocked. The termination circuit 624 can stably drive the receiving node RN to the termination voltage VT by sequentially changing the resistance value of the receiving node RN. The plurality of termination clock signals TCLK<0:5> may retain the disabled state in a stabilization period B of the signal SIG. The termination circuit 624 may be turned off based on the plurality of termination clock signals TCLK<0:5>, and not coupled to the receiving node RN. Therefore, the termination circuit 624 can reduce the current consumption of the second semiconductor apparatus 620 without consuming a current.

Figure 8:
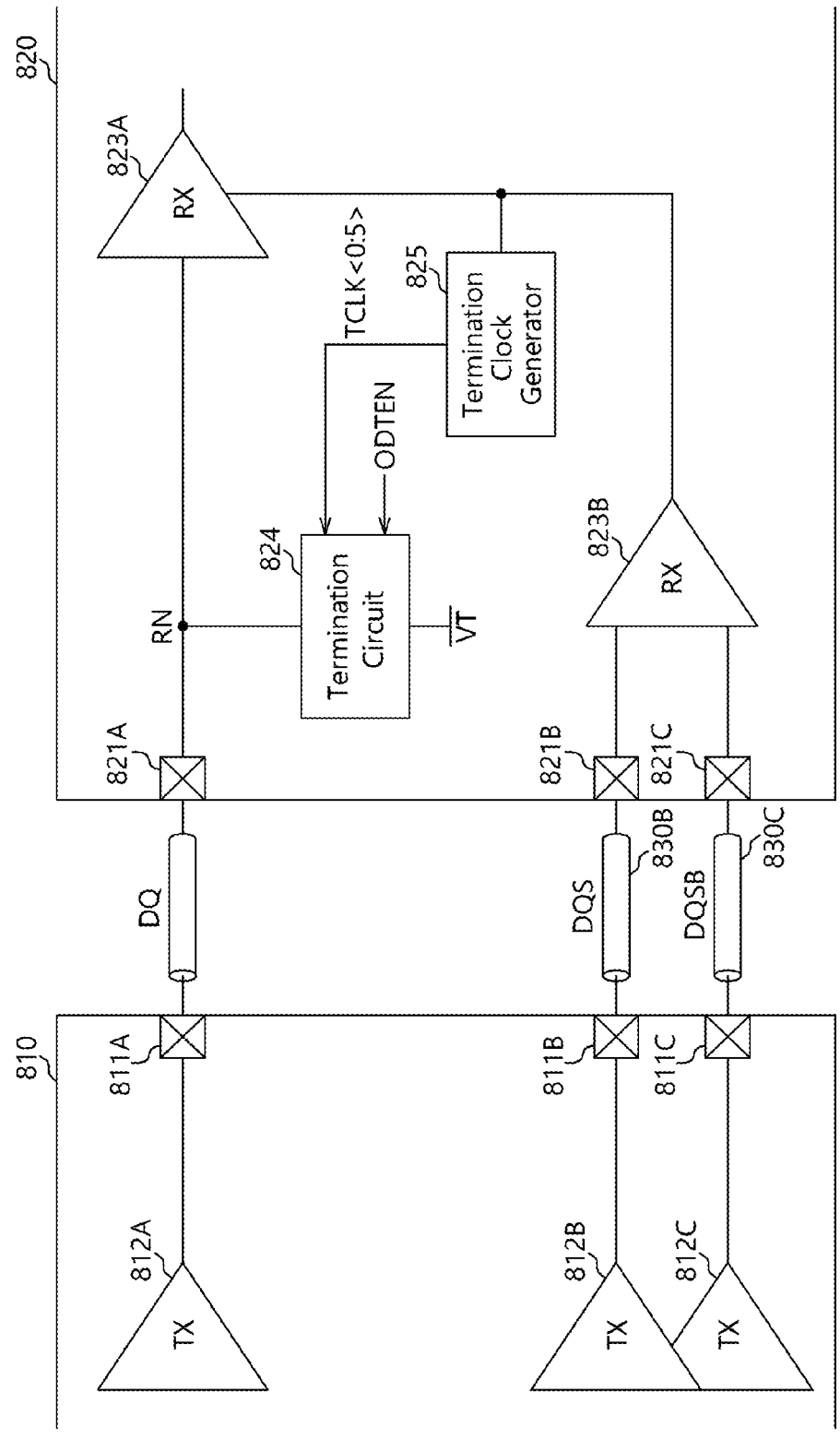
FIG. 8 is a diagram illustrating a configuration of a semiconductor system in an embodiment in accordance with the present invention.

FIG. 8 is a diagram illustrating a configuration of a semiconductor system 8 according to an embodiment. In FIG. 8, the semiconductor system 8 may include first and second semiconductor apparatuses 810 and 820. The first semiconductor apparatus 810 may include a plurality of transmitter circuits. A data transmitter circuit 812A may transmit data DQ through a pad 811A and a data bus 830A. Strobe transmitter circuits 821B and 821C may transmit data strobe signals DQS and DQSB through the pads 811B and 811C and strobe buses 830B and 830C. The data strobe signals DQS and DQSB may be synchronized with data DQ. For example, the strobe signals DQS and DQSB may include a clock signal which is center-aligned at a point of time that the level of the data DQ transitions. The data strobe signals DQS and DQSB may be differential signals. The second semiconductor apparatus 820 may include a plurality of receiver circuits. A data receiver circuit 823A may be coupled to the data bus 830A through a pad 821A, and receive data DQ transmitted from the first semiconductor apparatus 810 through the data bus 830A. A strobe receiver circuit 823B may be coupled to the strobe buses 830B and 830C through pads 821B and 821C, and receive the data strobe signals DQS and DQSB transmitted from the first semiconductor apparatus 810 through the strobe buses 830B and 830C. The data receiver circuit 823A may receive the data DQ transmitted through the data bus 830A in synchronization with the data strobe signals DQS and DQSB received through the strobe receiver 832B.

The second semiconductor apparatus 820 may include a termination clock generator 825 and a termination circuit 824. The termination clock generator 825 may generate a plurality of termination clock signals TCLK<0:5> based on the data strobe signals DQS and DQSB received through the strobe receiver circuit 823B. The plurality of termination clock signals TCLK<0:5> may include clock signals which are synchronized with the data strobe signals DQS and DQSB. For example, the termination clock generator 825 may generate the plurality of termination clock signals TCLK<0:5> which are sequentially enabled in synchronization with rising edges of the data strobe signals DQS and DQSB.

The termination circuit 824 may set the resistance value of the receiving node RN based on an enable signal ODTEN and the plurality of termination clock signals TCLK<0:5>, and drive the receiving node RN to the termination voltage VT. The termination circuit 824 may be turned on in a transition period of the data DQ based on the plurality of termination clock signals TCLK<0:5>, set the resistance value of the receiving node RN, and drive the receiving node RN to the termination voltage VT. The termination circuit 824 may be turned off in a stabilization period of the data DQ, and the coupling between the termination circuit 824 and the receiving node RN may be blocked. The termination circuits 224, 324, 524 and 624 illustrated in FIGS. 2, 3, 5 and 6 may be applied as the termination circuit 824.

FIG. 9 is a diagram illustrating the operation of the semiconductor system according to the present embodiment. Referring to FIGS. 8 and 9, the operation of the semiconductor system 8 according to the present embodiment will be described as follows. The first semiconductor apparatus 810 may transmit the data DQ through the data bus 830A, and transmit the data strobe signals DQS and DQSB through the strobe buses 830B and 830C, the data strobe signals DQS and DQSB toggling in synchronization with a transition point of the data DQ. Before the data DQ is transmitted, the enable signal ODTEN may be enabled. The strobe receiver circuit 823B may receive the data strobe signals DQS and DQSB transmitted through the strobe buses 830B and 830C. The termination clock generator 825 may receive the data strobe signals DQS and DQSB through the strobe receiver circuit 823B. The termination clock generator 825 may generate the plurality of termination clock signals TCLK<0: 5> which are sequentially enabled and then disabled in synchronization with rising edges of the data strobe signals DQS and DQSB.

The termination circuit 824 may have a resistance value set based on the enable signal ODTEN, and be coupled to the receiving node RN based on the plurality of termination clock signals TCLK<0:5>. The termination circuit 824 may be coupled to the receiving node RN in a high level period of the plurality of termination clock signals TCLK<0:5>, that is, the transition period A of the data DQ. When the termination circuit 824 is coupled to the receiving node RN, the resistance value of the receiving node RN may be set to the resistance value of the termination circuit 824, and the receiver circuit 823A may receive the data DQ while accurately sensing the level change of the data DQ. The termination circuit 824 may not be coupled to the receiving node RN in a low level period of the plurality of termination clock signals TCLK<0:5>, that is, the stabilization period B of the data DQ. Therefore, the current consumption of the termination circuit 824 can be reduced. At this time, since the level of the data DQ is not changed in the stabilization period B of the data DQ, the data receiver circuit 823B may have no difficulties in receiving the data DQ.

While certain embodiments have been described above, it will be understood to those skilled in the art that the embodiments described are by way of example only. Accordingly, the semiconductor apparatus described herein should not be limited based on the described embodiments. Rather, the semiconductor apparatus described herein should only be limited in light of the claims that follow when taken in conjunction with the above description and accompanying drawings.

What is claimed is:

1. A semiconductor apparatus comprising:
   a receiver circuit coupled to a receiving node, and configured to receive a signal transmitted through a signal transmission line; and
   a termination circuit configured, when the receiver receives the signal transmitted through the signal transmission line, to be turned on to set a resistance value of the receiving node in a transition period in which a level of the signal is changed, and turned off in a stabilization period in which the level of the signal is retained.

2. The semiconductor apparatus of claim 1, wherein the termination circuit is coupled to the receiving node based on an enable signal and a termination clock signal.

3. The semiconductor apparatus of claim 2, wherein the enable signal is enabled before the signal is transmitted, and disabled after the transmission of the signal is completed.

4. The semiconductor apparatus of claim 2, wherein the termination clock signal is enabled in each transition period of the signal.

5. The semiconductor apparatus of claim 2, wherein the termination circuit comprises:
   a termination resistor unit having a resistance value set based on the enable signal; and
   a switching unit configured to couple the termination resistor unit and the receiving node based on the termination clock signal.

6. The semiconductor apparatus of claim 2, wherein the termination circuit comprises:
   a switching control unit configured to generate a switching control signal by combining the enable signal and the termination clock signal; and
   a termination resistor unit configured to set a resistance value of the receiving node based on the switching control signal.

7. The semiconductor apparatus of claim 2, wherein the signal comprises data, and the termination clock signal is generated based on a data strobe signal.

8. A semiconductor apparatus comprising:
   a receiver circuit coupled to a receiving node, and configured to receive a signal transmitted through a signal transmission line;
   a termination clock generator configured to generate a plurality of termination clock signals which are sequentially enabled, based on a clock signal; and
   a termination circuit, when the receiver receives the signal transmitted through the signal transmission line, configured to set a resistance value of the receiving node based on an enable signal and the plurality of termination clock signals,
   wherein the plurality of termination clock signals are enabled in a transition period in which a level of the signal is changed and disabled in a stabilization period in which the level of the signal is retained.

9. The semiconductor apparatus of claim 8, wherein the termination clock generator sequentially disables the plurality of termination clock signals according to the order in which the plurality of termination clock signals are enabled.

10. The semiconductor apparatus of claim 8, wherein the plurality of termination clock signals are sequentially disabled.

11. The semiconductor apparatus of claim 8, wherein the termination circuit comprises:
    a termination resistor unit coupled in parallel between the receiving node and a termination voltage terminal, and comprising a plurality of resistor legs which are turned on based on the enable signal; and
    a switching unit configured to couple the plurality of resistor legs to the receiving node based on the plurality of termination clock signals.

12. A semiconductor apparatus comprising:
    a data receiver circuit coupled to a data bus to receive data, and configured to receive the data in synchronization with a data strobe signal;
    a strobe receiver circuit coupled to a strobe bus to receive the data strobe signal;
    a termination clock signal generator configured to generate a termination clock signal which is enabled in synchronization with the data strobe signal; and
    a termination circuit configured, when the data receiver receives the data in synchronization with the data strobe signal, to set a resistance value of a receiving node based on an enable signal and the termination clock signal.

13. The semiconductor apparatus of claim 12, wherein the termination clock signal is enabled in a transition period in which a level of the data is changed, and disabled in a stabilization period in which the level of the data is retained.

14. The semiconductor apparatus of claim 12, wherein the termination circuit drives the receiving node to a termination voltage level.

15. The semiconductor apparatus of claim 12, wherein the termination circuit comprises:
   a termination resistor unit having a resistance value set based on the enable signal; and
   a switching unit configured to couple the termination resistor unit and the receiving node based on the termination clock signal.

16. The semiconductor apparatus of claim 12, wherein the termination circuit comprises:
   a switching control unit configured to generate a switching control signal by performing an operation on the enable signal and the termination clock signal; and
   a termination resistor unit configured to set a resistance value of the receiving node based on the switching control signal.

17. A semiconductor apparatus comprising:
   a receiver circuit coupled to a receiving node, and configured to receive a signal transmitted through a signal transmission line; and
   a termination circuit, when the receiver receives the signal transmitted through the signal transmission line, configured to set a selectable resistance value among various resistance values of the receiving node,
   wherein the selectable resistance value is set during a transition period of the signal and removed during a stabilization period of the signal.

* * * * *